US005946103A

United States Patent [19]
Curry

[11] Patent Number: 5,946,103
[45] Date of Patent: Aug. 31, 1999

[54] HALFTONE PATTERNS FOR TRUSTED PRINTING

[75] Inventor: Douglas N. Curry, Menlo Park, Calif.

[73] Assignee: Xerox Corporation, Stamford, Conn.

[21] Appl. No.: 09/015,672

[22] Filed: Jan. 29, 1998

[51] Int. Cl.[6] .................................................. H04N 1/405
[52] U.S. Cl. ........................ 358/405; 358/298; 358/456; 358/459; 382/100; 382/112
[58] Field of Search .................................... 358/405, 298, 358/456, 459, 534, 535, 536, 457, 458; 382/135, 137; 380/18, 51, 54, 23, 4

[56] References Cited

U.S. PATENT DOCUMENTS

| | | | |
|---|---|---|---|
| 5,171,040 | 12/1992 | Orndorff | 283/93 |
| 5,315,098 | 5/1994 | Tow | 235/494 |
| 5,374,976 | 12/1994 | Spannenburg | 399/366 |
| 5,706,099 | 1/1998 | Curry | 358/298 |
| 5,710,636 | 1/1998 | Curry | 358/298 |
| 5,721,788 | 2/1998 | Powell et al. | 382/100 |
| 5,734,752 | 3/1998 | Knox | 382/212 |
| 5,790,703 | 8/1998 | Wang | 382/212 |
| 5,828,771 | 10/1998 | Bloomberg | 382/112 |

*Primary Examiner*—Edward L. Coles
*Assistant Examiner*—Joseph R. Pokrzywa

[57] ABSTRACT

Predetermined machine and/or human readable information is embedded in at least one serpentine pattern that is printed on each original document, so that any given instance of such a document can be later verified or refuted as being the original by determining whether this information can be recovered from the document or not.

1 Claim, 10 Drawing Sheets

FIG. 5
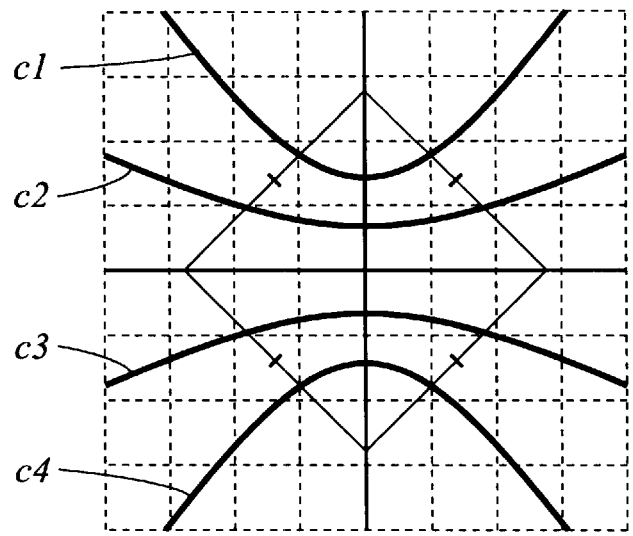
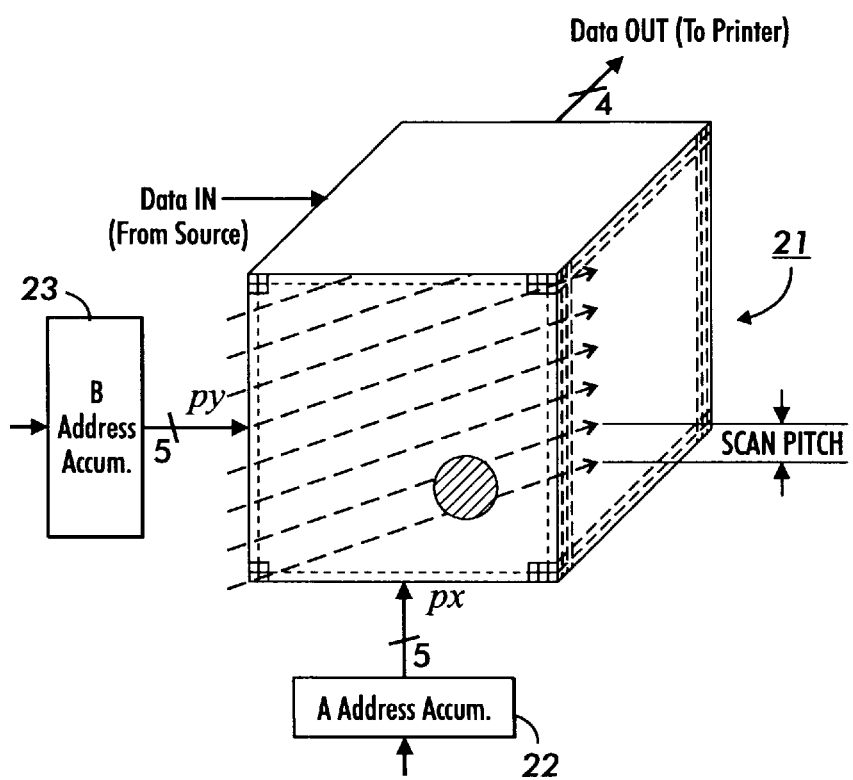
FIG. 6

FIG. 8
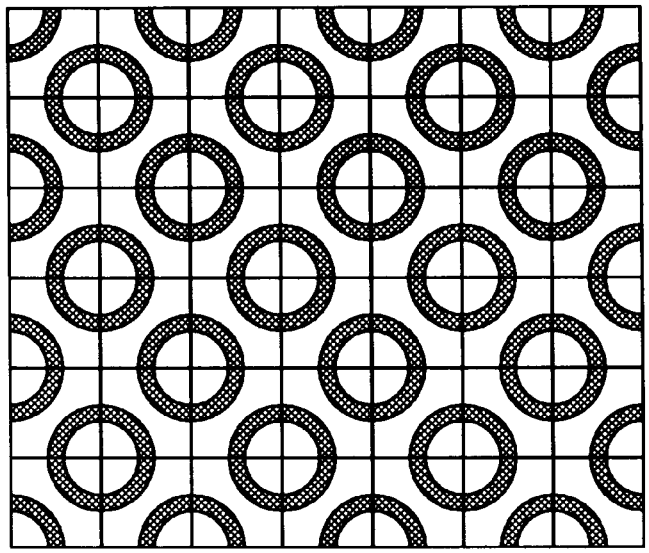
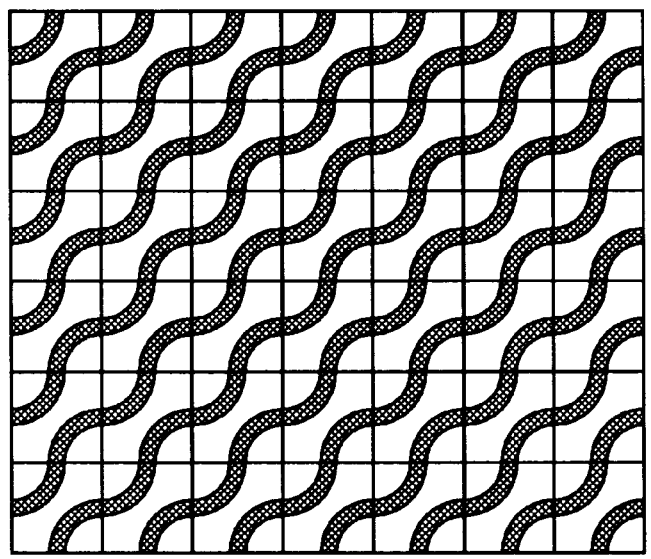
FIG. 9

FIG. 10
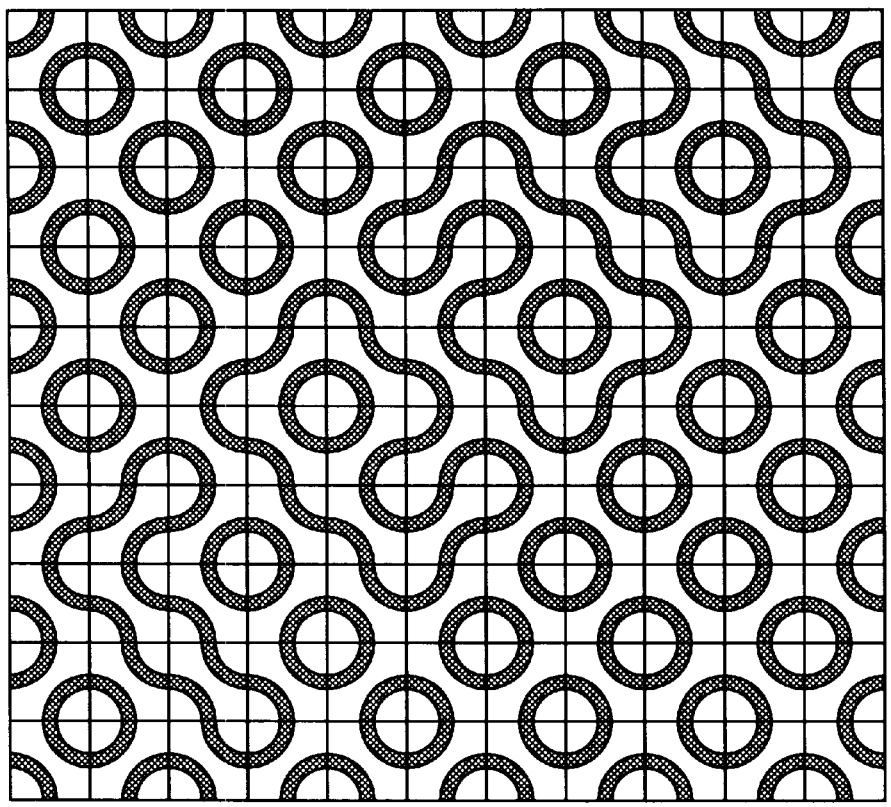
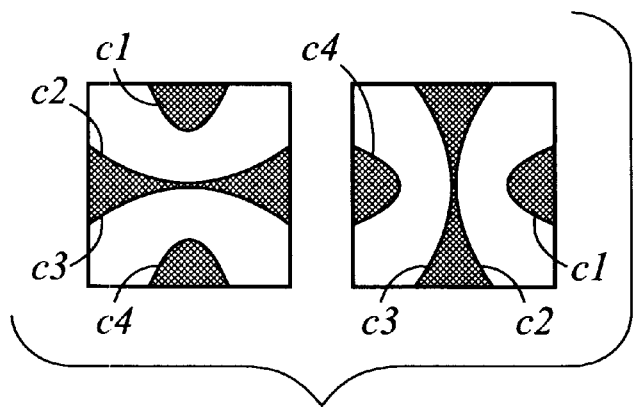
FIG. 11

FIG. 12
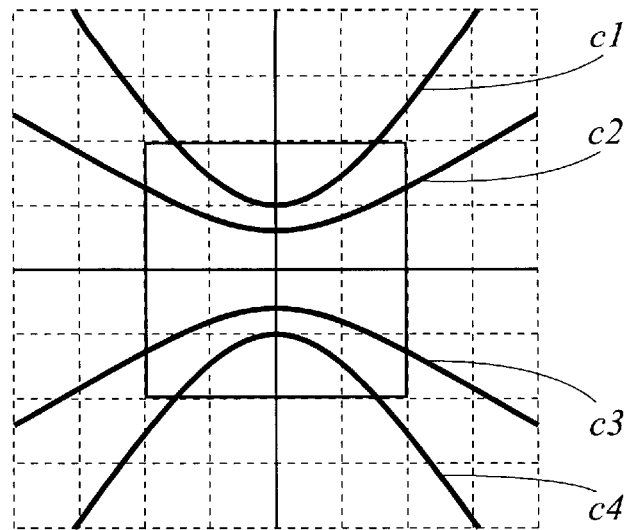
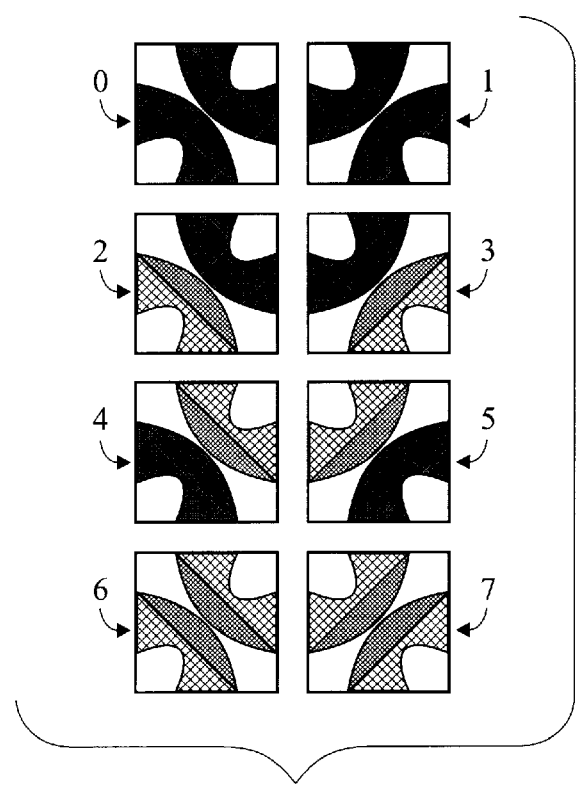
FIG. 13

HALFTONE PATTERNS FOR TRUSTED PRINTING

FIELD OF THE INVENTION

This invention relates to countermeasures to counterfeiting of halftone images by photocopying and the like.

BACKGROUND

Self-clocking glyph codes have been developed for embedding machine readable digital data in images of various descriptions. See, for example, a commonly assigned Bloomberg et al. United States continuing patent application, which was filed May 10, 1994 under Ser. No. 08/240,798 on "Self-Clocking Glyph Codes" (D/89194). Also see a commonly assigned Hecht et al. U.S. Pat. No. 5,453,605 which issued Sep. 26, 1995 on "Global Addressability for Self-Clocking Glyph Codes". To integrate these glyph codes into line art images, the data typically are embedded in small, similarly sized, spatially formatted, elliptical or slash-like marks or "glyphs" which are slanted to the left or right in generally orthogonal orientations to encode binary zeros ("0's") or ones ("1's"), respectively. Customarily, these glyphs are written on a spatially periodic, two-dimensional lattice of centers at a density that enables up to about 500 bytes of data per square inch to be stored on, say, a plain paper document. Clearly, therefore, these glyph codes are well suited for incorporating digital data channels into textual and other types of line art images. Indeed, one of the advantages of glyph codes of the foregoing type is that they tend to be esthetically unobtrusive because they have a generally uniform textured appearance and may sometimes even be perceived as having a substantially homogeneous gray scale appearance.

Tow described the use of "circularly asymmetric" halftone dots for incorporating self-clocking glyph codes into halftone images in a commonly assigned U.S. Pat. No. 5,315,112, which issued May 24, 1994 on "Methods and Means for Embedding Machine Readable Digital Data in Halftone Images." This is a workable approach if the data is confined to the midtone regions of the image in accordance with a known or identifiable spatial formatting rule. Unfortunately, however, excessive sensitivity is required to recover the embedded data with acceptable reliability from the darker or lighter regions of the image. Another drawback is that the background noise in halftone images that are composed of these asymmetric halftone dots may detract from the perceived quality of those images. For instance, four asymmetric dots may form a pattern extending radially outward from a central point, or they could form the sides of a square. These rotationally dependent differences are readily observable in images, and cause unwanted graininess and noise when viewing it.

My commonly assigned U.S. Pat. No. 5,706,099, which issued Jan. 6, 1998 on "Method and Apparatus for Generating Serpentine Halftone Images" and which is hereby incorporated by reference, provides a partial solution to the above problem by introducing circular serpentine halftone cell structures for embedding data in images. As shown in FIG. 1, these serpentine halftone cells have a high degree of rotational tone invariance. In practice, the circular arcs of these halftone cells vary in thickness as the cells vary in tone. Regardless of the tone, however, the central axis of each of the arcs of each of the halftone cells intersects adjacent sides of the cell at their respective midpoints. Thus, even though the embedded data value may cause the data axis (i. e., the axis of symmetry) of a cell to be oriented at +45° or −45° relative to the slow scan direction, the axes of these arcs substantially coincide with axes of the arcs of any adjacent halftone cells. See FIG. 1. Because the shape of the halftone cells at the cell boundary is similar regardless of the cell rotation, the noise associated with rotation is greatly reduced. These types of structures, with quarter circles in opposite corners of a square, are also known as Truchet tiles.

My above referenced patent further teaches that the arcuate fill patterns may be rotated 45° with respect to the halftone cell boundaries to produce another rotationally distinguishable pair of halftone structures. These structures have been called Manhattans and also are sometimes referred to as ortho-serpentines. However, these Manhattan or ortho-serpentine structures have a greater rotational tone variance than the serpentine cell structures. Therefore, they are intended primarily for special purposes, such as to provide the additional rotationally distinguishable cell structures that are needed to embed a pair of data bits in each halftone cell.

Unfortunately, the circular arc pairs of the halftone cell structures described in my above patent impose unwanted constraints on the dynamic tone range over which embedded machine readable data can be effectively recovered from halftone images composed of such cell structures. Referring to FIG. 2, as the line weight or thickness of the arcs increase to produce darker tones, the arcs reach an overlap state, as at 15, and the extent of the overlap then increases as the tone darkens. Once this overlap occurs, there is only the shape information in the four corners of the cell to differentiate an embedded zero ("0") from an embedded one ("1"), with the attendant risk the shape information will be misinterpreted, especially as the amount of overlap increases. Clearly, therefore, it would be beneficial to have a technique for constructing half tone cells which not only have substantial rotational tone invariance, but which also provide a readily identifiable orientation indicia over an extended tone range.

Document "originality" sometimes is an important consideration. Therefore, it would be desirable to have a technique for confirming the originality of documents against casual counterfeiting, such as by photocopying.

SUMMARY OF THE INVENTION

To realize the above-described goal, this invention provides method and means for embedding machine readable and/or human readable document information in halftone patterns, such as hyperbolic or circular serpentine patterns, which are resistant to replication by casual copying processes, such as photocopying. Predetermined machine and/or human readable information is embedded in these patterns during the printing of original documents by a trusted printer. Thus, the ability to recover this known information from a document is evidence that the questioned document is an original. Conversely, the inability to do so is evidence that the questioned document is at least suspect.

BRIEF DESCRIPTION OF THE DRAWINGS

Further objects and advantages of this invention will become apparent when the following detailed description is read in conjunction with the attached drawings, in which:

FIG. 5 illustrates a hyperbolic halftone shape that conforms to the shape function shown in FIG. 3;

FIG. 6 diagrammatically illustrates a suitable halftone generator;

FIG. 8 illustrates a non-random serpentine pattern;

FIG. 9 illustrates another non-random serpentine pattern;

FIG. 10 illustrates a serpentine pattern which contains human readable information;

FIG. 11 illustrates an ortho-serpentine halftone fill pattern;

FIG. 12 illustrates a complementary serpentine halftone fill pattern;

FIG. 13 illustrates the selective intensity modulation of the symmetric components of a data modulated serpentine pattern;

DETAILED DESCRIPTION

Figure 1:
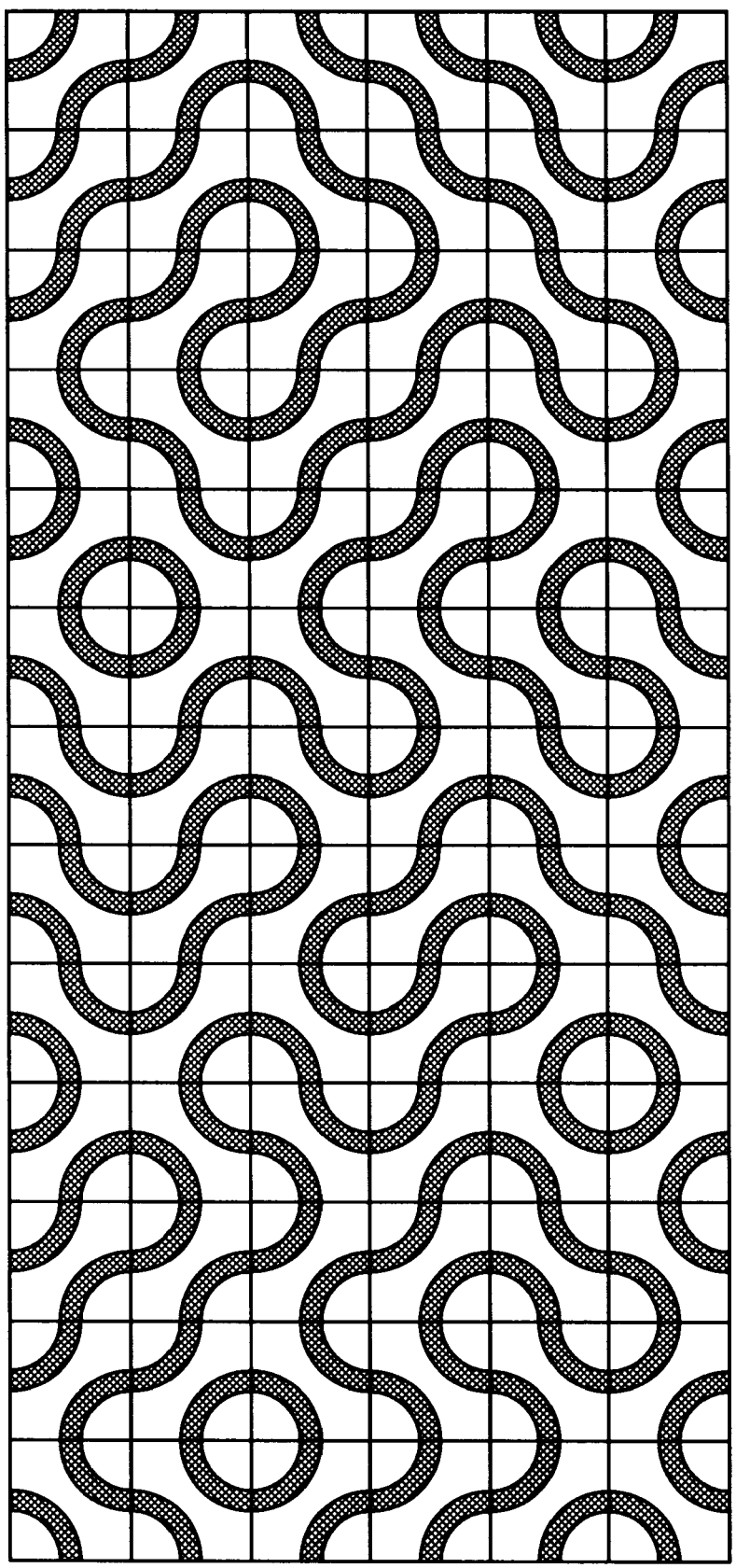
FIG. 1 illustrates a pattern composed of circular serpentine halftone cells.
Figure 2:
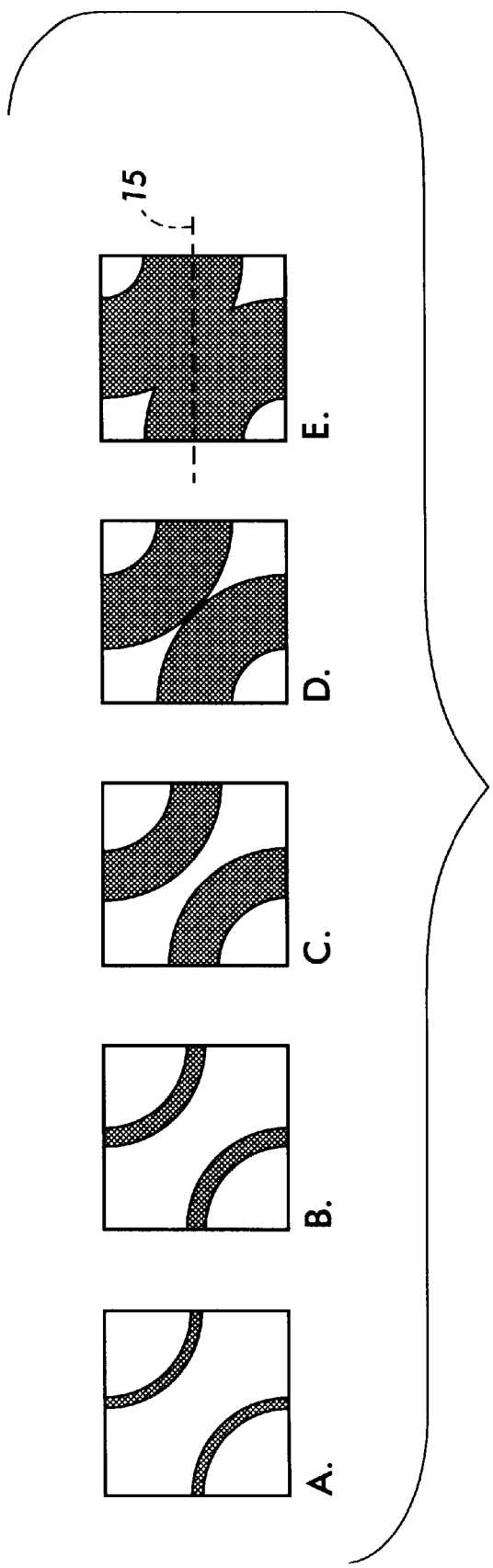
FIGS. 2A–E illustrate a set of circular serpentine halftone cells for progressively darker tone values, including tone values which cause overlap of the circular arcs that are used to construct these cells.

While the invention is described in some detail hereinbelow with reference to certain embodiments, it is to be understood that there is no intent to limit it to thereto. On the contrary, the intent is to cover all modifications, equivalents and alternatives that fall within the spirit and scope of the invention as defined by the appended claims.

I. Analytic Halftoning

As described in more detail in my commonly assigned U.S. Pat. No. 5,696,604, which issued Dec. 9, 1997 on "Analytic Halftone Dot Construction for a Hyperacuity Printer" and which is hereby incorporated by reference, the recommended method for generating halftone patterns in accordance with this invention differs somewhat from the traditional way that halftones are generated. The goal is to more precisely control the way the edges of the halftone fill pattern or "shape" evolves as it grows from highlight to shadow.

More particularly, in traditional digital halftoning, turning on an appropriate number of bits in a threshold array generates the desired tone. The array holds a sequence of threshold values that may spiral outward from a central location as the threshold values ascend. Bits corresponding to those locations in the halftone cell "turn on" if the incoming data intensity is equal to or greater than the threshold value for that bit location. This method generates halftone dots that grow asymmetrically, as one threshold after another is traversed through a range of intensity values from, say, 0 to 255.

For serpentine patterns, however, it is desired to grow the halftone fill pattern at all positions on its perimeter simultaneously to maintain better control of the shape. Therefore, a two step process typically is employed for generating the halftone fill patterns. First, an analytical shape function is defined which grows according to a predetermined evolution from the smallest shape for highlight regions, through midtones, and finally to full coverage of the halftone cell. In this step, shape information is maintained with "infinite precision" with analytic functions. Second, as the area of the shape gets larger, the fill pattern or shape is rendered as if it were a segment of text or lineart with a corresponding shape. The result is more control over the shape and the tone evolution of the halftone because they are defined with analytic functions. Nevertheless, it is believed that would be possible to use the traditional thresholding array to generate serpentines given a large enough threshold array.

A. The Hyperbolic Serpentine

There are two main goals when analytically defining the shape function. The first is to define functions that can evolve through growth from the smallest shape at intensity value of zero to the largest shape at a value of, say, 255 in a continuous manner. Any jumps in tone caused by discontinuities in the functions will be readily visible in the halftone images. The second goal is ensure that the functions can be solved for the position and angle of the nearest edge of the shape from any point within the halftone cell, at all stages of its evolution with analytic accuracy. This allows the shape to be precisely rendered.

1. The Shape Function

Figure 3:
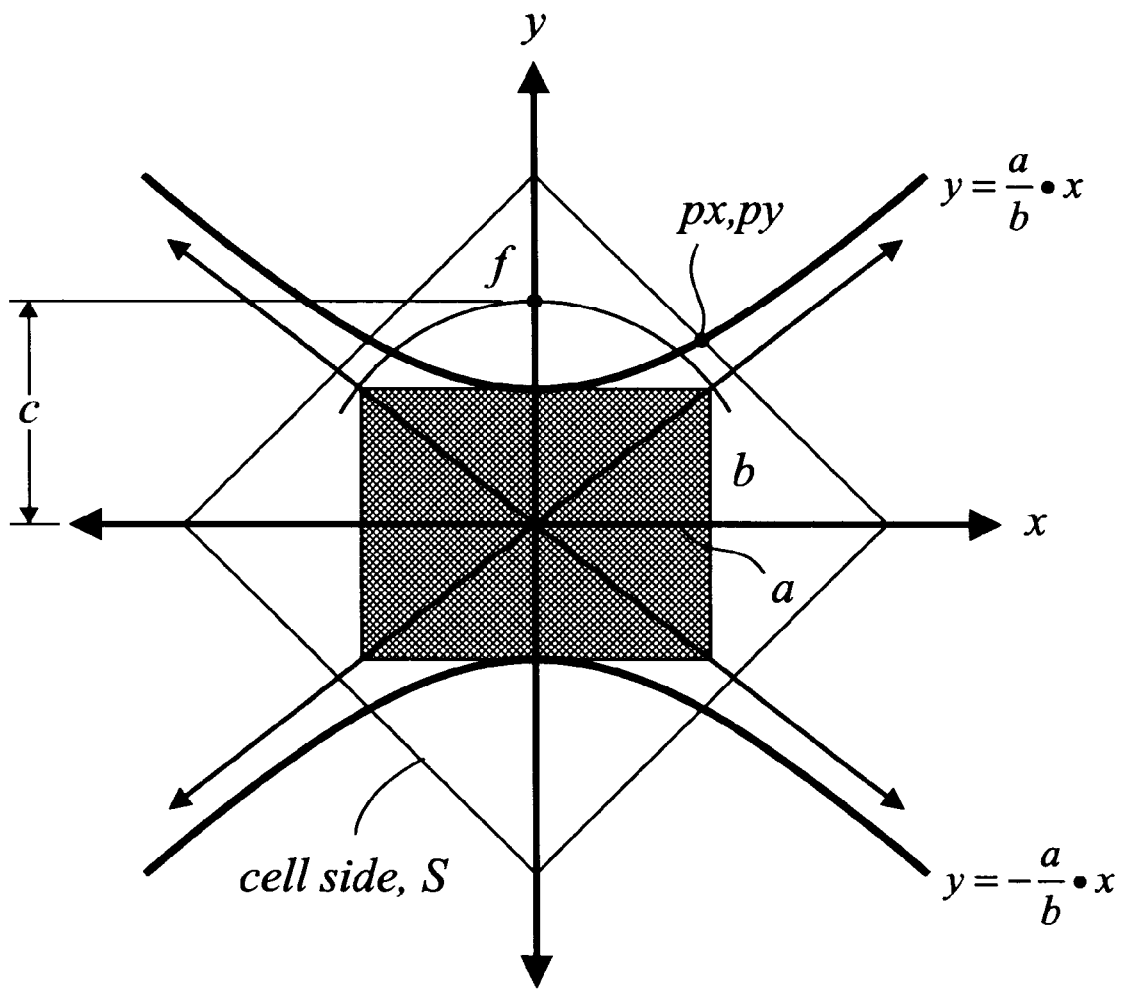
FIG. 3 illustrates a typical relationship between a halftone cell and an analytically defined hyperbolic shape function.

FIG. 3 shows the relationship between the halftone cell and a basic hyperbolic shape function. This relationship is developed starting with a hyperbola centered at the origin with foci on the y-axis so that:

$$\frac{y^2}{a^2} - \frac{x^2}{b^2} = 1 \qquad (1)$$

The intersection of the four lines, x=a, x=−a, y=b, and y=−b, define a rectangle whose diagonals form the asymptotes of the hyperbola. Now, if the position of the foci f of the hyperbola along the y-axis is set by c, then there is right triangle of sides a, b, and c, which conforms to the formula:

$$a^2 + b^2 = c^2 \qquad (2)$$

The length of the halftone cell side S is determined by the pixel size of the halftone cell. The strategy used to create a family of curves is to fix the focal point to a suitable value, and then select a x, y value along a halftone cell side, labeled px, py in FIG. 3, for each family member. Knowing x, y and c, equations (1) and (2) become simultaneous equations in two unknowns, a and b. Thus, they can be solved for a and b to create a single instance of equation (1) for each family member.

As will be appreciated, if the focal point were placed close to the origin, the family of hyperbolic curves that are generated would change direction abruptly near the origin and be fairly straight elsewhere. On the other hand, if the focal point were chosen close to the top apex of the halftone cell, the curves would remain fairly straight throughout the region of interest. As a compromise for these two extremes, a value of two-thirds the distance between the origin and cell apex suitably is selected for the focal point. Accordingly, let k=⅔ in the following equation for c:

$$c = k \cdot S \cdot \frac{\sqrt{2}}{2} \qquad (3)$$

The parameters b and a can then be found by the following relationships, by simultaneously solving equations (1) and (2):

$$b = \frac{\sqrt{2}}{2} \cdot \qquad (4)$$

$$\sqrt{c^2 - x^2 - y^2 + \sqrt{x^4 + 2 \cdot x^2 \cdot y^2 + y^4 + 2 \cdot c^2 \cdot x^2 - 2 \cdot c^2 \cdot y^2 + c^4}},$$

$$a = \sqrt{c^2 - b^2}$$

Figure 4:
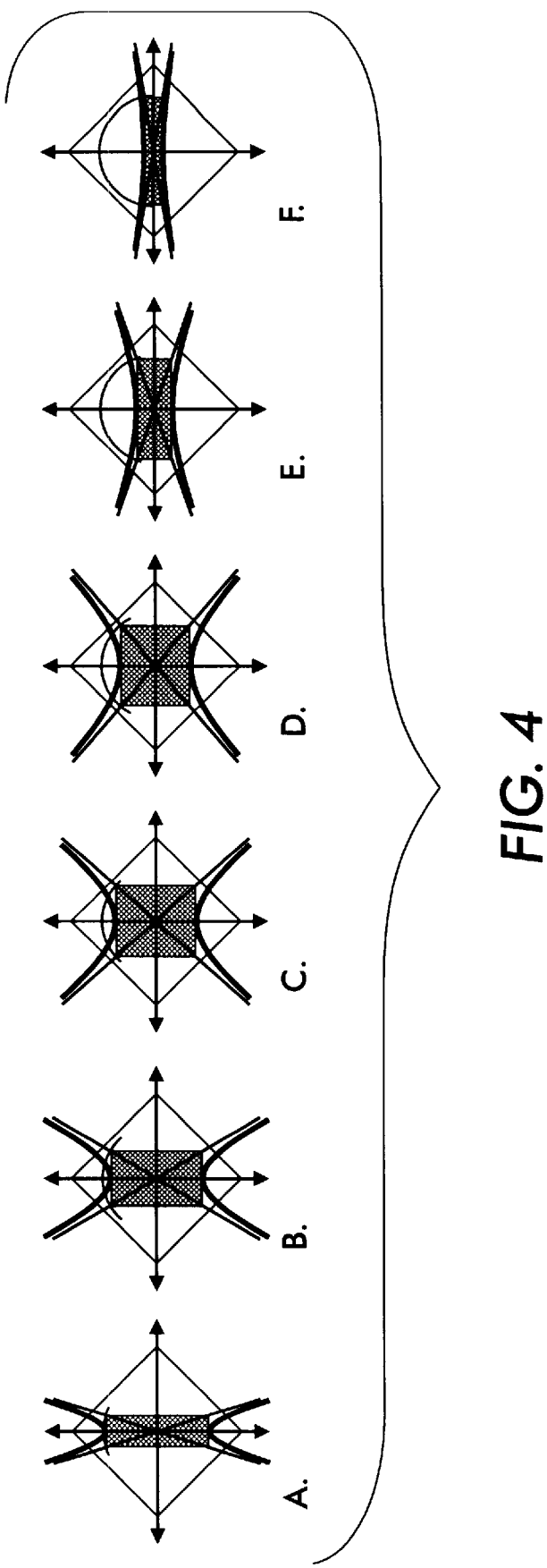
FIGS. 4A–F show representative examples of a family of hyperbolic curves conforming to the shape function shown in FIG. 3.
Figure 7:
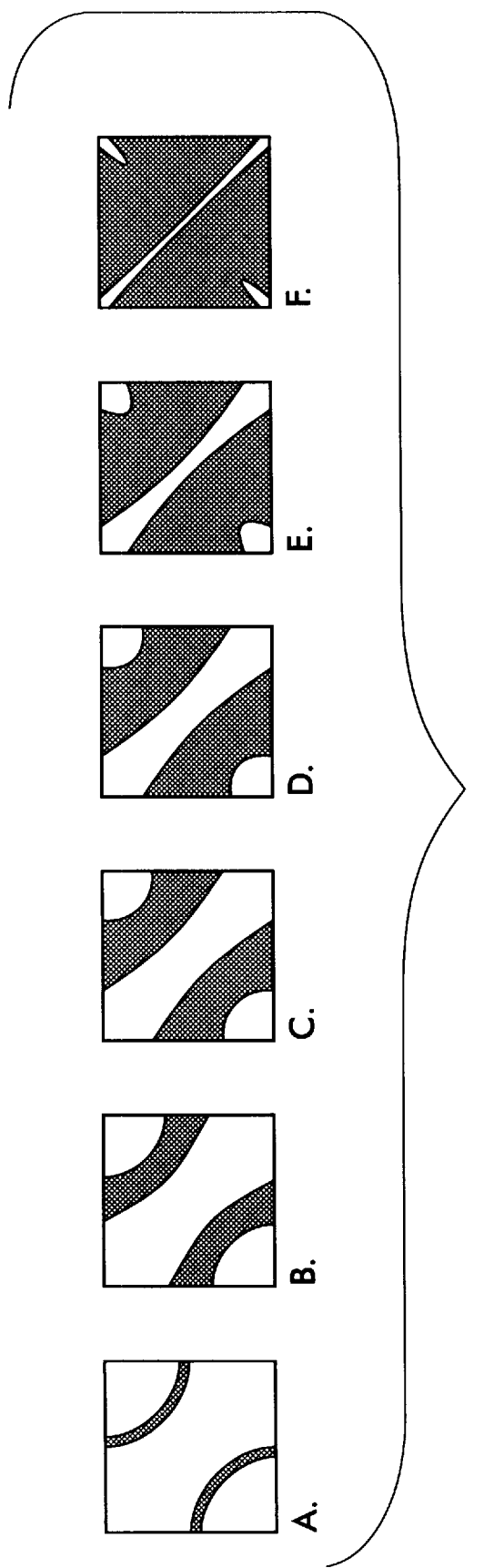
FIG. 7A–F illustrate the growth of hyperbolic halftone shapes.

FIG. 4 shows some representative examples of curves generated from different x=px, y=py, values on the sides of the halftone cell and when the focal point parameter k has been set to two-thirds.

2. Assembling the Shape

One of the qualities that causes the tone of serpentine halftone patterns to be substantially invariant to rotation is that there is very little change at the boundary between neighboring halftone cells upon 90-degree rotation. This is achieved by selecting the points of intersection for the curve pair defining the fill patterns or shape to be equidistant from the midpoint of the halftone cell side, S. Two hyperbolic curves are used to define the serpentine shape, and the points px, py at which those curves intersect the periphery of the halftone cell are selected so that these intersections are equally displaced in opposite directions from the midpoint of the cell side S. FIG. 5 illustrates an example of this situation for a curve pair c1 and c2, and also for the corresponding mirror image curve pair c3 and c4. These two curve pairs and the sides of the halftone cell typically define the fill-in region for a serpentine shape function.

3. Finding the Nearest Edge

As previously pointed out, the halftone shapes of this invention advantageously are rendered as though the shapes are sections of text or line art. In order to make full use of the analytic precision with which the halftone shape is defined, the rendering of the edges of the shape typically is carried out by modulating the laser of a laser printer (not shown) with a precision that is finer than the size of the scan spot. For instance, in the time it takes the spot to sweep out its own diameter, up to eight bits of digital information can be provided for modulating it. To this end, as shown in FIG. 6, the halftoner typically comprises a hierarchically organized table lookup memory 21 that is composed of a plurality of intensity "planes." Each of these intensity planes is, in turn composed of a two dimensional array, such as a 32×32 array, of individually addressable memory cells. For example, the lookup memory 21 suitably has 256 separately addressable data planes that are indexed to be selectively addressed by respective ones of the data values that may be received. A and B accumulators 22 and 23, on the other hand, accumulate numeric values modulo the A (horizontal) and B (vertical) dimensions (i. e., modulo 32) of the memory arrays that are provided for each of the intensity planes to track the location of the scan beam as it sweeps across successive halftone cells at a screen angle determined by the relative rate at which the values accumulated by the A and B accumulators are incremented.

As explained in more detail in my commonly assigned U.S. Pat. No. 5,410,414, which issued Apr. 25, 1995 on "Halftoning in a Hyperacuity Printer" and which is hereby incorporated by reference, this table lookup technique is capable of producing up to a byte of output data in response to each access. The A and B accumulators 22 and 23 are identified in the '414 patent as X and Y accumulators, respectively. However, X and Y are reserved for purposes of this disclosure for the fast scan and the slow scan directions of the printing process, so A and B designators have been applied to the accumulators 22 and 23 for increased clarity. In any event, the value that is loaded into each memory cell of each intensity plane of the look-up memory 21 is carefully selected to make full use of the distance and angle of the edge of the halftone fill pattern for that particular intensity plane from the spot's current position within the halftone cell that is being rendered. This is a critical difference from the traditional methods of halftoning, where only tone or density information is known.

More particularly, once both pairs of curves for the serpentine shape functions have been found, the task is to find the nearest edge of the shape from any possible spot position. These potential spot positions correspond to respective memory locations within the halftone cell, so each memory location corresponds to a specific spatial position. Hence, each memory location within the halftone cell can be designated $x_o$, $y_o$, corresponding to the center of the memory location on a x-y grid. The nearest point on the curve then is found by setting the negative reciprocal of the derivative of the curve at x,y to be equal to the slope of the line drawn between $x_o$, $y_o$ and x,y. By substituting the solution for y from equation (1), all references to y can be eliminated, thereby providing an equation in which the only unknown is x.

$$\frac{a}{\sqrt{\frac{x^2}{b^2}+1}} \cdot \frac{x}{b^2} + \frac{x-x_o}{a \cdot \sqrt{\frac{x^2}{b^2}+1} - y_o} = 0 \qquad (5)$$

A suitable routine for root extraction was used to evaluate x. The value of y was then found from equation (1). The distance and angle between spot position $x_o$, $y_o$ and cell location x, y is found, and an appropriate modulation value is stored in that memory cell. This process is repeated for all memory locations in the xo, yo plane, then again for all intensity planes in the lookup table 21. Since these values are calculated only once for each memory location in the lookup table 21, the time required for the root evaluation is not important. During printing, table lookup can be carried out at full print speed, with no calculations required.

B. Tone Reproduction

As will be understood, the look up table 21 provides a tone for each intensity required in the printing process. For instance, the table 21 may provide 256 different tones, one for every possible data input intensity value. Thus, as previously pointed out, the memory for the lookup table has three axis, the traditional two axes defining the x,y screen position within the halftone cell, and a third axis for indexing into the different "intensity planes" under the control of the data. Test prints for ordinary eight bit data values are made using a linear ramp of 256 different px,py values, starting from the midpoint of the sides (light tones) and ending at the cell apex (dark tones). These prints can be measured with a densitometer to find the actual tone delivered by the printer. By working backwards, the linear ramp of 256 px, py values can be adjusted into a curve which better represents the correct tone output for each input intensity value. This curve is called a tone reproduction curve, and can be highly accurate because of the "infinite precision" in which the shape functions are defined.

Contrast is an important characteristic of high quality images. Regions of little or no tone or fully saturated dark tones represent the extremes in a continuum of tones from highlights to shadows. The ability of the human observer to see light or dark regions extends beyond the ability of printing processes to deliver those densities. However, this does not preclude the printing process from making images that are extremely pleasing to the viewer. In addition, if one uses a loupe to examine many high quality pictorial images such as pictures of faces or landscapes, it will be found that many regions that look white or black really to the unaided eye are not fully saturated. This is because light regions may have small halftone structures and only seem light because of the surrounding darker regions. Likewise, the seemingly black regions may have white spaces between the halftone dots, and seem black because of the proximity of lighter regions. FIGS. 7A–F illustrate the growth of a typical hyperbolic serpentine halftone fill pattern.

Obviously, data cannot be embedded in regions where no halftone dots would otherwise exist, or where the dots are so fully saturated that they cover the image plane completely. Since contrast is relative, not only to the printing process but also to the human observer, suitable adjustments can be made to contrast of most images to permit data that is embedded in such images to be recovered reliably, especially if the data is redundantly recorded and/or protected by error correction codes that are computed on the data.

II. Data Embedding in Color

The 256 different halftone cells that can be generated by the halftone generator 21 in the embodiment shown in FIG. 6 are independent of the direction in which the serpentines are rendered. If desired, a serial stream of data bits that are to be embedded in the halftone image can be entered into the system through a separate channel, for example, as a ninth bit for at least certain of the data samples. However, the xerographic process that is performed by the color laser printer (not shown) may be limited to reproducing only 128 different (equally spaced) tones for each color layer (yellow, magenta, cyan, and black). If so, an eight-bit data channel can be used, with the least significant bit of each data sample being reserved for the embedded data. For such an implementation the serpentine shapes suitably are rendered in alternate directions into each intensity plane of the look-up table 21, with, say, the even numbered planes containing left slanted shapes and the odd numbered planes containing right slanted shapes.

Prototyping on a printer that prints at 400 scans per inch to deliver 100 serpentine halftone dots per inch. Each halftone dot carries one bit of embedded information, so there are roughly ten thousand bits or 1250 bytes of embedded data per square inch. Standard glyph "embedded data blocks" (EDB's) of the type described in the aforementioned U.S. Pat. No. 5,453,605 were used to provide the synchronization codes and redundancy for facilitating data recovery. This typically reduces the data density by a factor of 2.5, for an overall data density of 500 bytes per square inch.

Identical embedded data was delivered to each color plane so that the serpentine shapes overlap exactly when reproducing full color images. It would be much more difficult to control the color if this were not done. The colors would then depend on the embedded data, as well as on the image data, because the overlap of the color separations would vary as a function of the differences in the data that are embedded in the yellow, magenta, cyan or black layers.

III. Embedded data patterns.

The serpentine shape can be tiled into many different and interesting patterns independent of the overlying image. By clustering data in non-random patterns, certain useful shapes are formed. For example, by alternating zeros and ones as on a checkerboard, an array of circular "donut" patterns are formed, as in FIG. 8. Patterns of this type might be useful for data synchronization during data recovery, especially where these donut-like patterns are arrayed in a "frame" surrounding an area of embedded data. Indeed, it may be found that it is easier to recognize frames made from these macro shapes rather than constant or pseudo randomly varying "0's and/or 1"s.

FIG. 9 shows an example of an image representing an unbroken string of "1's". This "wavy" pattern is similar to a line screen, viz., a type of halftone where images are rendered by a series of vertical lines throughout the image with only their width modulated to impart tone. The wavy nature of these serpentines gives a two-dimensional aspect to what would otherwise be a generally straight line. This serpentine pattern has a longer perimeter than the equivalent straight line pattern, which means that it is a foundation for increasing the number of different tone levels that can be effectively produced at a given halftone frequency.

IV. Human Readable Data Patterns.

Another way to cluster the embedded data is to create patterns that have textual significance, and therefore the possibility of being human readable without scanning or the need for computer decoding. Please see my commonly assigned U.S. Pat. No. 5,710,636, which issued Jan. 20, 1998 on "Method and Apparatus for Generating Halftone Images Having Human Readable Patterns Formed Therein" (D/95111) and which is hereby incorporated by reference. For example, the word "read" is embedded in the tiling pattern of FIG. 10. In this case, several dozen bits of clustered data are arranged to produce an alphanumeric character shape which may be considered an equivalent to a character represented by a standard 8-bit ASCII character code. Synchronization codes are unnecessary, since there is no computer required to scan and decode the data. Typically, such human readable patterns are redundantly encoded in the images that contain them. Depending on the size of the text represented by such a pattern and its design, a redundancy factor of between 3 and 5 would be a rough norm.

Various sizes and shapes of human readable patterns have been constructed, and it has been found that the smaller ones usually are easier to read, because the field of view through a loupe or magnifying glass is often limited. Subjects given the images for the first time benefit from seeing as large an area as possible. Asking the subjects to spell out the individual letters as they see them is also helpful. When subjects are given images and a loupe and merely asked to find the hidden message in the background halftone, the problem usually encountered is that the subject does not know at what scale to look for the embedded words. However, if given a hint in the form of a blown-up image with a sample message that has been highlighted, the learning time is greatly reduced. Once the observer learns what to look for, the task of reading the data becomes easy.

One of the features that distinguishes this type of embedded data from many other types is that only low technology is required to decode the messages; i. e., only a magnifying glass is required, which is readily available worldwide. Authentication therefore does not require an input scanner, computer, hard to obtain plastic overlay, or other device that may not be at hand or easily obtainable.

V. Quadrature Encoding.

The foregoing discussion contemplates discriminating between ninety-degree rotations of the halftone shape. Smaller rotational displacements may be employed for embedding the data with a concurrent increase in the data channel capacity, subject only to the limitations of the discrimination technology. For example, some effort has been devoted to the development of a way to make and use halftone structures with an orthogonal relationship to the image instead of slanted to the left or right by forty-five degrees. When combined with the slanted halftones, this work resulted in a system with four discriminable halftone structures for embedding data in halftone images. Referring again to FIG. 6, to construct these additional serpentines, the cell is oriented so that its apex is at the top and so that the serpentine shapes bounded by the two pairs of curves c1, c2 and c3, c4 are filled in.

By simply rotating the cell forty-five degrees and complementing the fill-in area between the curves, a new type of "ortho-serpentine" shape can be constructed. This is shown in FIGS. 11 and 12. The fill-in areas are now between c1 and the cell top, c4 and the cell bottom, or between c2, c3 and the cell sides. Note that the curves still are aligned so that the fill-in area boundaries on the cell sides are equal. This insures that the tone remains unaffected at the cell boundary through ninety-degree rotations.

These cells can be used as the diagonally oriented serpentines were used for embedding data in two directions, or combined with the diagonal serpentines to achieve quadrature encoding. The vertical or horizontal nature of the orientation allows more and varied patterns to be constructed.

Unfortunately, this ortho-serpentine style of halftone cell shape does not behave as nicely in patterns as the diagonal serpentines do. The problem is that the shape supplies two "dead ends" with every cell. These cause the loss of halftone continuity that gives a "noisy" halftone appearance. However, there is a possibility of reducing the noise by employing higher halftone frequencies, and there may be uses for this structure within images that are less susceptible to noise.

There are also two other permutations of the fill-in region and shape orientation that should be noted. As shown in FIG. 12, these are derived by complimenting the fill-in regions of the above described halftone fill patterns to produce shapes that emanate from the corners of the halftone cells instead of the sides. The complementary shape derived from the basic serpentine pattern of FIG. 5 is another instance of a shape that has a pair of "dead ends", so the complementary shape derived from the ortho-serpentine shape FIG. 11 is likely to have lower noise characteristics.

VI. Watermarking

An interesting extension of serpentine embedded data may be applied, for example, to watermarking. A watermark is either a visible secondary embedded image in a document which is extremely difficult to copy, or an invisible data signature in an image that is extremely difficult not to copy. This application of serpentines focuses on the first of these types watermarking strategies.

As shown in FIG. 13, a serpentine halftone structure is effectively composed of two mirror image shapes which are symmetrical with respect to the diagonal data axis of the halftone cell. Each of the symmetrical halves of the halftone cell has the interesting property that its tone or shade can be independently offset from the local tone of the image by some predetermined amount. Accordingly, two permutations of this offset may be created at each of the permissible angular orientations of the serpentine shape, It therefore, follows that a shape that has two permissible angular orientations can accommodate up to four distinctive permutations of this half cell intensity modulation. For example, the cell labeled "2" in FIG. 13 is constructed using an intensity offset of zero for its upper-right half, so that the tone of this portion of the cell faithfully represents the image data. However, the tone of the lower-right half of that same cell is intensity modulated by a positive offset from the image dependent intensity level if the image value is less than half the full intensity or by a negative offset from that image dependent level if the image value is greater than half the full intensity. Likewise, the cell labeled "4" has such an intensity offset applied to its upper-right half, and the cell labeled "6" has such an offset applied to both of its halves. As will be appreciated, this selective tone modulation may be employed to advantage, for example, to make human readable embedded data patterns more noticeable to the human eye. To accomplish that the halftone cell structures that are used to compose such embedded secondary data patterns would be selectively offset from the primary image. For example, this technique could be employed to visually offset the word "read" in FIG. 10 from its surroundings.

Figure 14:
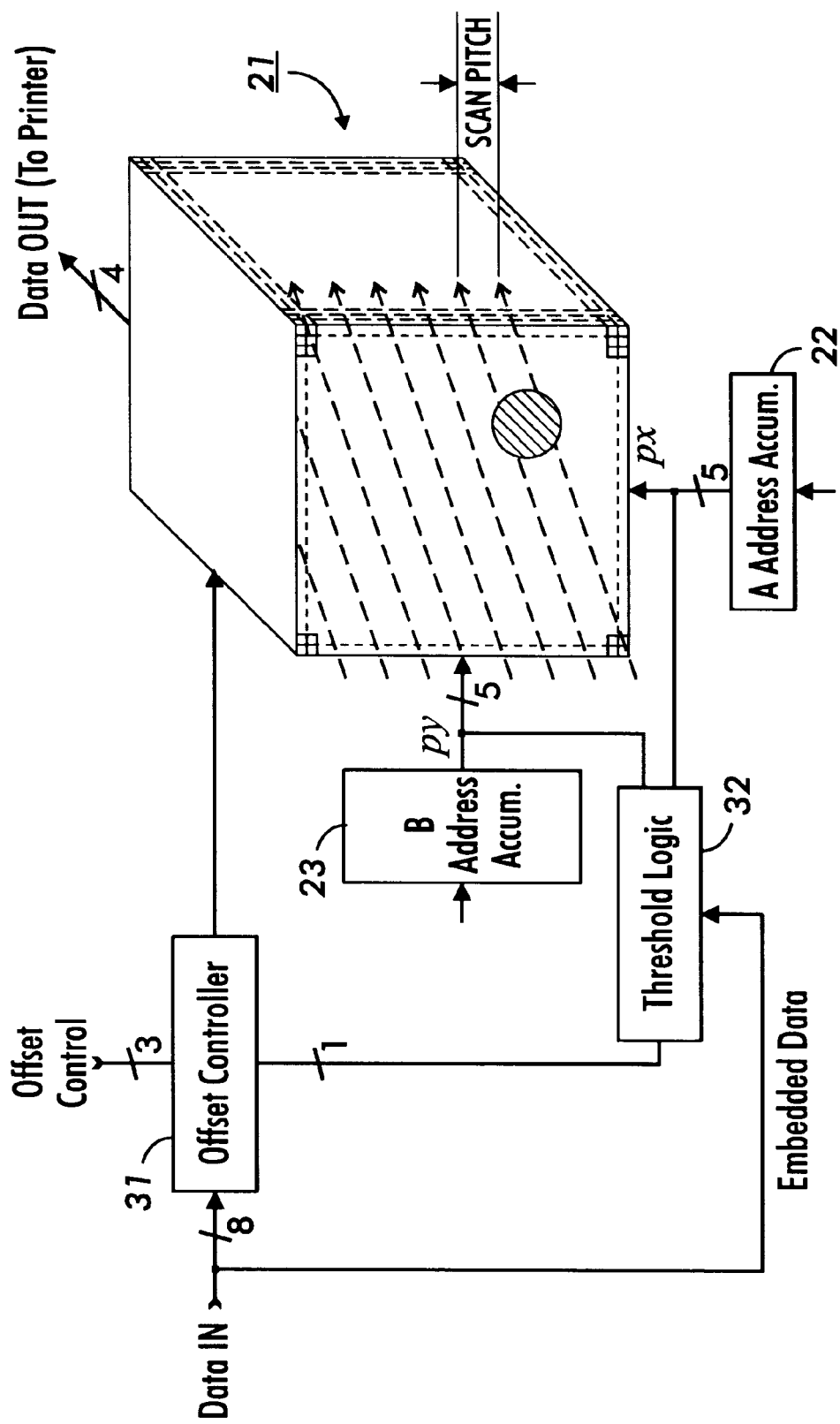
FIG. 14 schematically illustrates a halftone generator for implementing the selective intensity modulation shown in FIG. 12

Turning to FIG. 14, this selective modulation process can be readily implemented by supplementing the data channel of the halftone generator shown in FIG. 6 to include a controller 31 for selectively adding or subtracting a predetermined digital offset value to or from the data samples in response to a digital description of the desired modulation and a digital representation of the existing position of the laser beam with respect to the halftone cell it is printing. The orientation of the halftone cell that is under construction at any given time typically is dependent on the bit value of the data that is being embedded therein. However, the transition of the laser beam from one half to the other of a halftone cell having it data axis tilted to the left is confirmed when the sum of the A and B accumulators passes through a predetermined value (32 in the illustrated example). Similarly, the transition of the laser beam from one half to the other of a halftone cell having it data axis tilted to the right is confirmed when by the difference of the A and B accumulators passes through another predetermined value (0 in this example). Accordingly, straightforward data responsive threshold logic 32 can be employed to arithmetically monitor the values accumulated by the accumulators 22 and 23 to identify for the controller 31 which half of the halftone cell the scan spot happens to be in. On the other hand, the digital description of the desired intensity modulation typically is applied to the controller 31 as a digital value of sufficient bit length to discriminate among the modulation states (e.g., three bit long values to accommodate the eight states illustrated in FIG. 13).

5. Trusted printing application 5.1. Copying

The serpentines printed in full color, with the correct color balance and halftone shapes are extremely difficult to reproduce reprographically. The narrow, diagonally extending, unfilled areas in halftone cells representing the darker tones (see FIG. 7) are especially difficult to reproduce faithfully because ordinary copying tends to cause near neighboring shapes to blur together, thereby degrading (if not obliterating) the shape information and clues that aid in determining cell direction. Without these distinguishing features, the image takes on the form of a "waffle" pattern, and is easily recognized as a forgery. This has been observed with halftones printed at screen frequencies of only about 100 cells per inch. Therefore, it is believed that the resistance of these serpentine patterns to forgery by photocopying will increase in higher quality images which typically have halftone frequencies of roughly 150 to 200 cells per inch.

Although typical color copiers are excellent at reproducing the correct tones for high quality images, they must supply their own halftone algorithms to do this properly. They usually have their own electronic halftoners embedded in the electronics of the machine, and these haftoners typically are optimized for machine dependent tone reproduction curves and implementationally dependent halftone dot shapes. Accordingly, it is extremely unlikely that an existing halftone that is not a serpentine can reproduce a serpentine halftone. Another possible method of reproducing serpentine images is to scan them in, process the image to determine cell orientation, then reproduce the original data file required to print an "original". This requires access to a printer that can print serpentines, an unlikely prospect for the casual counterfeiter.

Accordingly, serpentines are an excellent candidate for trusted printing applications. For this application, a "trusted printer" (i. e., a printer controlled by a trusted party, such as a service bureau) typically is employed for printing original documents that are designed to include one or more serpentine patterns. Predetermined machine and/or human readable information is embedded in at least one of the serpentine patterns that is printed on each original document, so that any given instance of such a document can be later verified or refuted as being the original instance by attempting to recover this known information from the document in question. This is not an absolute safeguard against counterfeiting, but it is a significant hindrance to those who may attempt to pass off xerographic copies or other conveniently produced copies as original documents.

6. Conclusion

A high performance halftone shape that can be used to spatially embed data in printed documents has been presented. Called a serpentine because of its meandering nature, it can also display high quality images independent of its ability to embed data. Basing the shape structure on a hyperbola instead of a circle extends its dynamic tone range. The shape enables precise tone control and can used for color printing. The embedded data can be framed into data blocks such as those used in a standard glyph format, or clustered into patterns that are shaped like numbers or letters. These structures have the advantage of being human readable with the aid of a magnifying glass, and do not require the use of an input scanner or computer. By rotating the shape 45-degrees, two alternate "ortho-serpentine" structures can be constructed which can be added to the diagonal structures, creating an embedded data system with four orientations. The quadrature system also allows more and varied patterns, but has the disadvantage of additional noise.

The feature that gives serpentines a large dynamic range also makes them difficult to copy. As the hyperbolas asymptotically approach the limiting diagonal of the halftone cell, the small region of white is extremely difficult to copy without loss of contrast. The resulting "waffle" appearance of the halftone screen conveniently lacks directionality. This makes serpentines a candidate for image authentication and counterfeit deterrence.

A trusted printing application was presented that relies on the difficulty in copying serpentine embedded data. A printing service is used to make inexpensive serpentine originals and establish a revenue stream back to authors and document owners. Counterfeiting the low value prints is unattractive because of the difficulty in creating serpentine originals, the need to make many copies to be profitable, and the risk of detection through physical distribution.

What is claimed is:

1. A method for verifying the originality of printed documents, said method comprising the steps of providing at least one trusted printer for printing original documents;

embedding predetermined information in each of said original documents in at least one halftone pattern that is composed of halftone cells, each of said cells containing a fill pattern which is symmetric about a central axis of the cell, with said information being represented by the angular orientations of the respective axis of symmetry of at least some of said cells;

classifying said documents as original documents only if said predetermined information can be recovered therefrom.

\* \* \* \* \*